US011292888B2

(12) United States Patent
Jang et al.

(10) Patent No.: US 11,292,888 B2
(45) Date of Patent: *Apr. 5, 2022

(54) NON-REACTIVE FLUORO COMPOUND AND PHOTOPOLYMER COMPOSITION COMPRISING THE SAME

(71) Applicant: LG CHEM, LTD., Seoul (KR)

(72) Inventors: Seok Hoon Jang, Daejeon (KR); Heon Kim, Daejeon (KR); Boo Kyung Kim, Daejeon (KR); Yeong Rae Chang, Daejeon (KR); Yongjoon Heo, Daejeon (KR); Se Hyun Kwon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 92 days.

This patent is subject to a terminal disclaimer.

(21) Appl. No.: 16/756,072

(22) PCT Filed: Oct. 16, 2018

(86) PCT No.: PCT/KR2018/012194
§ 371 (c)(1),
(2) Date: Apr. 14, 2020

(87) PCT Pub. No.: WO2019/078585
PCT Pub. Date: Apr. 25, 2019

(65) Prior Publication Data
US 2020/0255623 A1 Aug. 13, 2020

(30) Foreign Application Priority Data

Oct. 16, 2017 (KR) .................. 10-2017-0134212
Oct. 15, 2018 (KR) .................. 10-2018-0122648

(51) Int. Cl.
G03H 1/02 (2006.01)
G03F 7/035 (2006.01)
G11B 7/245 (2006.01)
C08G 18/79 (2006.01)
C08G 18/78 (2006.01)
C08G 18/32 (2006.01)
C08G 18/08 (2006.01)
C08K 5/02 (2006.01)
G11B 7/0065 (2006.01)
C08K 5/00 (2006.01)
G03H 1/26 (2006.01)

(52) U.S. Cl.
CPC ............ *C08K 5/02* (2013.01); *C08G 18/08* (2013.01); *C08G 18/3206* (2013.01); *C08G 18/3215* (2013.01); *C08G 18/7831* (2013.01); *C08G 18/7837* (2013.01); *C08G 18/7843* (2013.01); *C08G 18/7887* (2013.01); *C08G 18/791* (2013.01); *C08G 18/797* (2013.01); *C08G 18/798* (2013.01); *G03H 1/0248* (2013.01); *G11B 7/0065* (2013.01); *G11B 7/245* (2013.01); *C08K 5/0016* (2013.01); *G03H 2001/264* (2013.01); *G03H 2260/12* (2013.01); *G03H 2260/14* (2013.01); *G03H 2260/30* (2013.01)

(58) Field of Classification Search
CPC ........................................................ G03F 7/035
See application file for complete search history.

(56) References Cited

U.S. PATENT DOCUMENTS

| 3,451,908 | A | | 6/1969 | Sianesi et al. | |
|---|---|---|---|---|---|
| 3,847,978 | A | * | 11/1974 | Sianesi et al. | C08G 69/42 562/577 |
| 3,956,293 | A | * | 5/1976 | Pavlik | C07C 51/06 544/85 |
| 4,576,752 | A | * | 3/1986 | Krespan | C07C 247/00 526/243 |
| 4,827,042 | A | | 5/1989 | Lagow et al. | |
| 5,202,501 | A | | 4/1993 | Lagow et al. | |
| 5,399,291 | A | * | 3/1995 | Janulis | C09K 19/3469 252/299.01 |
| 5,399,758 | A | * | 3/1995 | Miura | C07C 243/28 564/148 |
| 5,539,059 | A | * | 7/1996 | Bierschenk | C08G 65/3236 204/157.95 |
| 6,303,227 | B1 | * | 10/2001 | Kuwahara | G11B 5/725 428/421 |
| 7,998,913 | B2 | * | 8/2011 | Hendriks | G11B 33/146 508/504 |
| 8,466,210 | B2 | * | 6/2013 | Zech | A61K 6/887 523/109 |
| 11,079,678 | B2 | * | 8/2021 | Jang | G03F 7/0758 |
| 11,084,933 | B2 | * | 8/2021 | Kim | C07F 5/02 |
| 2003/0013923 | A1 | | 1/2003 | Marchionni et al. | |
| 2004/0137334 | A1 | | 7/2004 | Otaki et al. | |
| 2007/0286993 | A1 | | 12/2007 | Radcliffe et al. | |

(Continued)

FOREIGN PATENT DOCUMENTS

JP 63-501367 A 5/1988
JP 1-226844 A 9/1989

(Continued)

OTHER PUBLICATIONS

Hitoshi et al., "Non-ionic photoacid generators for chemically amplified photoresists: Structure effect on resist performance", Proc SPIE 6153 articles 61530F (10 pages) (Mar. 2006).*

(Continued)

Primary Examiner — Martin J Angebranndt
(74) Attorney, Agent, or Firm — Dentons US LLP

(57) ABSTRACT

A photopolymerizable composition including: a polymer matrix or a precursor thereof containing a reaction product of an acrylate-based polyol and a compound containing at least one isocyanate group; a photoreactive monomer; and a non-reactive fluoro compound and a photoinitiator; a hologram recording medium produced from the composition; an optical element including the hologram recording medium; and a method of recording a hologram using the photopolymerizable composition.

12 Claims, No Drawings

(56) References Cited

U.S. PATENT DOCUMENTS

| | | | |
|---|---|---|---|
| 2009/0062419 A1 | 3/2009 | Stockel et al. | |
| 2010/0024685 A1 | 2/2010 | Sakano et al. | |
| 2012/0231376 A1 | 9/2012 | Rolle et al. | |
| 2018/0051148 A1 | 2/2018 | Kim et al. | |
| 2018/0072830 A1 | 3/2018 | Yoshida et al. | |
| 2019/0339612 A1* | 11/2019 | Kim | G03F 7/035 |
| 2020/0150528 A1* | 5/2020 | Jang | G11B 7/24044 |
| 2020/0192218 A1* | 6/2020 | Jang | G03H 1/02 |
| 2020/0355996 A1* | 11/2020 | Kim | G03F 7/033 |
| 2021/0003919 A1* | 1/2021 | Kim | G03F 7/075 |
| 2021/0026239 A1* | 1/2021 | Kim | G03F 7/001 |
| 2021/0239894 A1* | 8/2021 | Jang | C08L 33/10 |

FOREIGN PATENT DOCUMENTS

| | | |
|---|---|---|
| JP | 08-321035 A | 12/1996 |
| JP | 2001-282082 A | 10/2001 |
| JP | 2002-42324 A | 2/2002 |
| JP | 2003-302726 A | 10/2003 |
| JP | 2004-191919 A | 7/2004 |
| JP | 3924872 B2 | 6/2007 |
| JP | 2008-34064 A | 2/2008 |
| JP | 2010-523774 A | 7/2010 |
| JP | 2010-237621 A | 10/2010 |
| JP | 2011-41938 A | 3/2011 |
| JP | 2020-502100 A | 1/2020 |
| KR | 10-127859 B1 | 4/1998 |
| KR | 10-2003-0005988 A | 1/2003 |
| KR | 2003-0071343 A | 9/2003 |
| KR | 10-2012-0107086 A | 9/2012 |
| KR | 10-2014-0024484 A | 2/2014 |
| KR | 10-2017-0019329 A | 2/2017 |
| WO | 03/072625 A1 | 9/2003 |
| WO | 2017/018489 A1 | 2/2017 |
| WO | 2018/108866 A1 | 6/2018 |

OTHER PUBLICATIONS

Fears et al. "A study of perfluorocarboxylate ester solvents for lithium ion battery electrolytes" J. Power Sources, vol. 299 pp. 434-442 (2015).*

Marchionni et al., "Physical properties of four $\alpha$, $\omega$-dimethoxyfluoropolyethers", Journal of Fluorine Chemistry, vol. 126, pp. 465-473 (2005).

* cited by examiner

NON-REACTIVE FLUORO COMPOUND AND PHOTOPOLYMER COMPOSITION COMPRISING THE SAME

CROSS-REFERENCE TO RELATED APPLICATIONS

This application is a U.S. national stage of international application No. PCT/KR2018/012194 filed on Oct. 16, 2018, and claims the benefit of priority from Korean Patent Application No. 10-2017-0134212 filed with Korean Intellectual Property Office on Oct. 16, 2017 and Korean Patent Application No. 10-2018-0122648 filed with Korean Intellectual Property Office on Oct. 15, 2018, the entire contents of which are incorporated herein by reference.

FIELD

The present invention relates to a non-reactive fluoro compound, a photopolymerizable composition containing the same, a holographic recording medium, an optical element, and a hologram recording method.

BACKGROUND

A holographic recording medium generates a diffraction grating in a hologram recording layer through an exposure process, and reads information by detecting a change in the refractive index in the recorded medium.

Since a photopolymerizable resin (photopolymer) can easily store an optical interference pattern as a hologram by photopolymerization of a low molecular weight monomer, it can be used in various fields such as optical lenses, mirrors, deflecting mirrors, filters, diffusing screens, diffraction elements, light guides, waveguides, holographic optical elements having projection screen and/or mask functions, media of optical memory systems and light diffusion plates, optical wavelength multiplexers, reflection-type and transmission-type color filters, and the like.

Typically, the photopolymerizable composition for hologram production includes a polymer binder, a monomer, and a photoinitiator, and the photosensitive film containing hologram recording layers produced from such a composition is irradiated with laser interference light to induce photopolymerization of selective monomers.

In such a photopolymerization process, the refractive index of the polymerized portion of the monomer is higher than that of the non-polymerized portion, whic results in refractive index modulation, and generation of a diffraction grating. A refractive index modulation value n is influenced by a thickness and diffraction efficiency (DE) of the photopolymerizable layer, and angular selectivity increases as the thickness decreases.

Recently, as the demand for the development of materials capable of stably maintaining holograms with high diffraction efficiency has increased, various attempts have been made to produce thin photopolymerizable layers having high refractive index modulation values.

SUMMARY

An exemplary embodiment is a non-reactive fluoro compound having a specific chemical structure.

An exemplary embodiment is a photopolymerizable composition including the non-reactive fluoro compound and capable of more easily providing a thin photopolymerizable layer having high refractive index modulation values.

An exemplary embodiment is a hologram recording medium including a thin photopolymerizable layer having high refractive index modulation values.

An exemplary embodiment is an optical element including a hologram recording medium.

An exemplary embodiment is a holographic recording method including selectively polymerizing photoreactive monomers contained in the photopolymerizable composition by electromagnetic radiation.

DETAILED DESCRIPTION

The present invention provides a non-reactive fluoro compound represented by the following Chemical Formula 1 or 2.

The non-reactive fluoro compound represented by the following Chemical Formula 1 or 2:

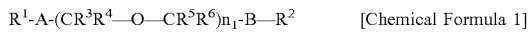
[Chemical Formula 1]

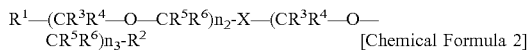
[Chemical Formula 2]

wherein, in Chemical Formula 1 or 2, $R^1$ and $R^2$ are terminal blocking groups that are the same as or different from each other, and are each independently an alkyl ester group having 1 to 10 carbon atoms or an alkyl ether group having 1 to 10 carbon atoms which is substituted or unsubstituted with a halogen atom, A and B are a single bond or an alkylene group having 1 to 5 carbon atoms, $R^3$ to $R^6$ are the same as or different from each other, and are each independently hydrogen, a halogen atom, or an alkyl group having 1 to 5 carbon atoms, and at least one of $R^3$ to $R^6$ is a fluorine atom, each $n_1$ to $n_3$ is an integer of 1 to 5, and X is an alkylene having 1 to 10 carbon atoms or an alkyl ether group having 1 to 10 carbon atoms.

The present invention also provides a photopolymerizable composition including:

A) a polymer matrix or a precursor thereof containing a reaction product of i) an acrylate-based polyol having an OH equivalent of 1000 g/mol or more and a weight average molecular weight of 500,000 or more, and ii) an isocyanate compound;

B) the above-mentioned non-reactive fluoro compound;

C) a photoreactive monomer; and

D) a photoinitiator.

In addition, the present invention provides a hologram recording medium including a hologram recording layer formed by the photopolymerizable composition.

Moreover, the present invention provides an optical element including the above-mentioned hologram recording medium.

Further, the present specification provides a method of recording a hologram, including selectively polymerizing photoreactive monomers by irradiating the above-mentioned hologram recording medium with actinic rays.

In the present invention, the term "(meth)acrylate" may include a methacrylate or an acrylate.

Further, the term "hologram" as used herein refers to a recording medium on which optical information is recorded in the entire visible range and in the near ultraviolet range (300 to 800 nm) through an exposure process. of the term "hologram" also refers to all visual holograms, including, but not limited to, in-line (Gabor) holograms, off-axis holograms, full-aperture transfer holograms, white light transmission holograms ("rainbow holograms"), Denisyuk holograms, off-axis reflection holograms, edge-literature holograms, and holographic stereograms.

The present invention will now be described in more detail.

First, according to one aspect of the present invention, a non-reactive fluoro compound represented by the following Chemical Formula 1 or 2 is provided.

The non-reactive fluoro compound is represented by the following Chemical Formula 1 or 2:

$$R^1\text{-}A\text{-}(CR^3R^4\text{—}O\text{—}CR^5R^6)_{n_1}\text{-}B\text{—}R^2 \quad \text{[Chemical Formula 1]}$$

$$R^1\text{—}(CR^3R^4\text{—}O\text{—}CR^5R^6)_{n_2}\text{-}X\text{—}(CR^3R^4\text{—}O\text{—}CR^5R^6)_{n_3}\text{-}R^2 \quad \text{[Chemical Formula 2]}$$

wherein, in Chemical Formula 1 or 2, $R^1$ and $R^2$ are terminal blocking groups that are the same as or different from each other, and are each independently an alkyl ester group having 1 to 10 carbon atoms or an alkyl ether group having 1 to 10 carbon atoms which is substituted or unsubstituted with a halogen atom, A and B are a single bond or an alkylene group having 1 to 5 carbon atoms, $R^3$ to $R^6$ are the same as or different from each other, and are each independently hydrogen, a halogen atom, or an alkyl group having 1 to 5 carbon atoms, and at least one of $R^3$ to $R^6$ is a fluorine atom, each $n_1$ to $n_3$ is an integer of 1 to 5, and X is an alkylene having 1 to 10 carbon atoms or an alkyl ether group having 1 to 10 carbon atoms.

The term "non-reactive" as used herein means that the above-mentioned compound does not react with an acrylate-based polyol, an isocyanate, a photoreactive monomer, and the like.

In the present invention, the alkyl ether group having 1 to 10 carbon atoms includes both an alkoxy group (alkyl-O—) and an alkylene oxide repeating unit (-alkylene-O—).

The non-reactive compounds may have a refractive index of less than about 1.45, preferably about 1.30 to about 1.45, more preferably about 1.30 to about 1.40, or about 1.35 to about 1.40, based on their unique chemical structure.

The compound may have a molecular weight of about 300 or more, more preferably about 300 to about 1000, or about 550 to about 800.

In the chemical formulas, $R^3$ to $R^6$ are the same as or different from each other, and are each independently hydrogen, a halogen atom, or an alkyl group having 1 to 5 carbon atoms, and more than half of the $R^3$ to $R^6$ may include fluorine atoms.

The non-reactive fluoro compound may preferably include a repeating unit represented by the following Chemical Formula 3.

$$-(CF_2\text{—}O\text{—}CF_2)- \quad \text{[Chemical Formula 3]}$$

The non-reactive fluoro compound includes an ethylene glycol repeating unit and a terminal blocking group, and the carbon constituting the ethylene glycol repeating unit necessarily has a fluorine substituent. These compounds may be obtained by using, as a precursor, mono-, di-, tri-, tetra-, or penta-ethylene glycol (fluorinated-ethylene glycol) containing 1 to 5 ethylene glycol repeating units containing fluorine, and performing a catalytic reaction to introduce a terminal blocking group in the hydroxy group of the precursor compound.

At this time, the temperature for introducing the ester group or the ether group as a blocking group, the catalyst, and the like can be employed without particular limitation as long as they are commonly used in the technical field to which the present invention belongs. Specifically, when the ester group is introduced as a terminal blocking group, it can be bonded by using an acyl chloride compound and a trimethylamine as a base. When the ether group is introduced as a terminal blocking group, it can be bonded to the ethylene glycol precursor containing fluorine as a blocking group by using an alkoxy chloride compound, NaH, and the like.

In addition, according to one embodiment, a photopolymerizable composition can be provided, including:

A) a polymer matrix or a precursor thereof containing a reaction product of i) an acrylate-based polyol having an OH equivalent of 1000 g/mol or more and a weight average molecular weight of 500,000 or more, and ii) an isocyanate compound;

B) the above-mentioned non-reactive fluoro compound;

C) a photoreactive monomer; and

D) a photoinitiator.

The present inventors found through experiments that a hologram formed from a photopolymerizable composition containing a polymer matrix formed from a specific acrylate-based polyol and an isocyanate compound as described above can significantly improve the refractive index modulation value and diffraction efficiency even for thin photopolymerization layers compared to previously known holograms. In addition, the inventors found through experiments that when the above-mentioned non-reactive fluoro compound is used in addition to such a matrix component, the sensitivity to recording light can be increased by maximizing the difference in refractive indexes between the exposed portion and the non-exposed portion, thereby making it possible to significantly increase the recording efficiency. The present invention has been completed on the basis of such findings.

The polymer matrix can act as a support for the photopolymerizable composition and the final product such as a film produced therefrom. The hologram formed from the photopolymerizable composition can serve to enhance the refractive index modulation as a portion having different refractive indexes.

As described above, the polymer matrix may include a reaction product between an acrylate-based polyol and a compound containing at least one isocyanate group. Accordingly, the precursor of the polymer matrix includes a monomer or an oligomer forming the polymer matrix, and specifically, it may contain the acrylate-based polyol and a compound containing at least one isocyanate group.

As described above, the polyol used as the isocyanate-reactive component is preferably an acrylate-based polyol having an OH equivalent of 1000 g/mol or more, and a weight average molecular weight of 500,000 or more.

Among them, the acrylate-based polyol may more preferably be an alkyl acrylate whose alkyl group has 1 to 5 carbon atoms, and a compound containing a repeating unit derived from a hydroxyalkyl acrylate whose alkyl group has 1 to 5 carbon atoms. It is most preferred that the OH equivalent is about 1000 to about 2000 g/mol and the weight average molecular weight is about 600,000 to about 800,000.

The monomer for constituting the above-mentioned acrylate-based repeating unit is the alkyl acrylate component whose alkyl group has 1 to 5 carbon atoms, and examples thereof include methyl(meth)acrylate, ethyl(meth)acrylate, propyl(meth)acrylate, butyl(meth)acrylate, pentyl(meth) acrylate, and the like.

Further, the hydroxyalkyl acrylate monomer whose alkyl group has 1 to 5 carbon atoms may include hydroxyethyl (meth)acrylate, hydroxypropyl(meth)acrylate, hydroxybutyl (meth)acrylate, and the like.

In this case, the hydroxyalkyl acrylate may preferably be used in an amount of about 1 to about 15 parts by weight based on 100 parts by weight of the alkyl acrylate, in terms of controlling the OH equivalent of the polyol, and it may most preferably be used in an amount of about 5 to about 10 parts by weight.

The compound containing at least one isocyanate group may be a known compound having an average of one or more NCO functional groups per molecule or a mixture thereof, and it may be a compound containing at least one isocyanate group.

More specifically, the polyisocyanate compound may include aliphatic, cycloaliphatic, aromatic, or araliphatic mono-isocyanate, di-isocyanate, tri-isocyanate, or poly-isocyanate; or oligo-isocyanates or poly-isocyanates of di-isocyanates or tri-isocyanates having a urethane, urea, carbodiimide, acylurea, isocyanurate, allophanate, biuret, oxadiazinetrione, uretdione or iminooxadiazinedione structure.

Specific examples of the compound containing at least one isocyanate group include butylene diisocyanate, hexamethylene diisocyanate (HDI), isophorone diisocyanate (IPDI), 1,8-diisocyanato-4-(isocyanatomethyl)octane, 2,2,4- and/or 2,4,4-trimethylhexamethylene diisocyanate, isomeric bis(4,4'-isocyanatocyclohexyl)methanes and mixtures thereof having any desired isomer content, isocyanatomethyl-1,8-octane diisocyanate, 1,4-cyclohexylene diisocyanate, isomeric cyclohexanedimethylene diisocyanates, 1,4-phenylene diisocyanate, 2,4- and/or 2,6-toluene diisocyanate, 1,5-naphthylene diisocyanate, 2,4'- or 4,4'-diphenylmethane diisocyanate, and/or triphenylmethane 4,4',4''-triisocyanate, and the like.

Meanwhile, the polyol which reacts with the compound containing at least one isocyanate group to form a polymer matrix may further include other types of diols, triols, or polyols in addition to the above-mentioned acrylate-based polyols. More specifically, the polyol, which reacts with the compound containing at least one isocyanate group to form a polymer matrix, may further include at least one selected from the group consisting of aliphatic aromatic diols, triols, or polyols having 2 to 20 carbon atoms; alicyclic diols, triols, or polyols having 4 to 30 carbon atoms; and aromatic diols, triols, or polyols having 6 to 30 carbon atoms.

According to one embodiment of the present invention, the isocyanate compound may be used in an amount of about 5 to about 50 parts by weight, preferably about 10 to about 30 parts by weight, based on 100 parts by weight of the acrylate-based polyol, in terms of controlling the matrix crosslinking property between the polyol component and the isocyanate component.

The photopolymerizable composition further includes a polyol other than an acrylate-based polyol, and thereby the crosslinking point in the polymer matrix of the hologram can be more easily controlled, and the degree of crosslinking of the polymer matrix can be further enhanced. Even in this case, the hologram produced from the photopolymerizable composition of the embodiment can have a high refractive index modulation value and diffraction efficiency even in the range of thin thickness.

Examples of the diols are ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, diethyloctanediol positional isomers, 1,3-butylene glycol, cyclohexanediol, 1,4-cyclohexanedimethanol, 1,6-hexanediol, 1,2- and 1,4-cyclohexanediol, hydrogenated bisphenol A (2,2-bis(4-hydroxycyclohexyl)propane), and 2,2-dimethyl-3-hydroxypropyl dimethyl-3-hydroxypropionate.

Further, examples of the triols are trimethylolethane, trimethylolpropane, and glycerol. Suitable higher-functional alcohols are ditrimethylolpropane, pentaerythritol, dipentaerythritol, and sorbitol.

Further, as the polyols, relatively high molecular weight aliphatic and cycloaliphatic polyols, such as polyester polyols, polyether polyols, polycarbonate polyols, hydroxy-functional acrylic resins, hydroxy-functional polyurethanes, and hydroxy-functional epoxy resins, can be used.

Polyesterpolyols are linear polyester diols, and can be prepared in a known manner from aliphatic, cycloaliphatic, or aromatic di- or polycarboxylic acids or their anhydrides, such as, for example, succinic acid, glutaric acid, adipic acid, pimelic acid, suberic acid, azelaic acid, sebacic acid, nonanedicarboxylic acid, decanedicarboxylic acid, terephthalic acid, isophthalic acid, o-phthalic acid, tetrahydrophthalic acid, hexahydrophthalic acid, or trimellitic acid acid, and acid anhydrides such as o-phthalic anhydride, trimellitic anhydride, and succinic anhydride, or a mixture thereof with polyhydric alcohols, such as, for example, ethanediol, di-, tri-, or tetraethylene glycol, 1,2-propanediol, di-, tri-, or tetrapropylene glycol, 1,3-propanediol, 1,4-butanediol, 1,3-butanediol, 2,3-butanediol, 1,5-pentanediol, 1,6-hexanediol, 2,2-dimethyl-1,3-propanediol, 1,4-dihydroxycyclohexane, 1,4-dimethylolcyclohexane, 1,8-octanediol, 1,10-decanediol, 1,12-dodecanediol, or mixtures thereof, optionally with concomitant use of higher functional polyols, such as trimethylolpropane or glycerol. Of course, cycloaliphatic and/or aromatic di- and polyhydroxy compounds are also suitable as polyhydric alcohols for the preparation of the polyester polyols. Instead of the free polycarboxylic acid, it is also possible to use the corresponding polycarboxylic anhydrides or corresponding polycarboxylates of lower alcohols or mixtures thereof for the preparation of the polyesters.

Further, polyester polyols which can be used for the synthesis of the polymer matrix are homo- or copolymers of lactones, which are preferably obtained by an addition reaction of lactones or lactone mixtures, such as butyrolactone, ε-caprolactone, and/or methyl-ε-caprolactone, with suitable difunctional and/or higher-functional initiator molecules, such as, for example, the low molecular weight polyhydric alcohols mentioned above as synthesis components for polyester polyols.

Polycarbonates having hydroxyl groups are also suitable as a polyhydroxy component for the prepolymer synthesis, for example those which can be prepared by reaction of diols, such as 1,4-butanediol, 1,6-hexanediol, and/or 3-methylpentanediol, with diaryl carbonates, e.g. diphenyl carbonate, dimethyl carbonate, or phosgene.

Polyether polyols which can be used for the synthesis of the polymer matrix are, for example, the polyaddition products of styrene oxides, ethylene oxide, propylene oxide, tetrahydrofuran, butylene oxide, epichlorohydrin, and their mixed adducts and graft products, and the polyether polyols obtained by condensation of polyhydric alcohols or mixtures thereof and those obtained by alkoxylation of polyhydric alcohols, amines, and amino alcohols.

Specific examples of the polyether polyols are poly(propylene oxides), poly(ethylene oxides) and combinations thereof in the form of random or block copolymers or poly(tetrahydrofurans) and mixtures thereof having OH functionality of 1.5 to 6 and a number average molecular weight between 200 and 18,000 g/mol, preferably having OH functionality of 1.8 to 4.0 and a number average molecular weight of 600 to 8000 g/mol, and particularly preferably having OH functionality of 1.9 to 3.1 and a number average molecular weight of 650 to 4500 g/mol.

Meanwhile, the photopolymerizable composition includes a non-reactive fluoro compound represented by the following Chemical Formula 1 or 2.

The non-reactive fluoro compound is represented by the following Chemical Formula 1 or 2:

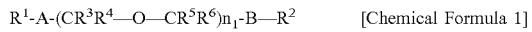  [Chemical Formula 1]

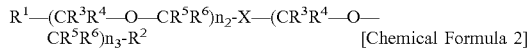  [Chemical Formula 2]

wherein, in Chemical Formula 1 or 2, $R^1$ and $R^2$ are terminal blocking groups that are the same as or different from each other, and are each independently an alkyl ester group having 1 to 10 carbon atoms or an alkyl ether group having 1 to 10 carbon atoms which is substituted or unsubstituted with a halogen atom, A and B are a single bond or an alkylene group having 1 to 5 carbon atoms, $R^3$ to $R^6$ are the same as or different from each other, and are each independently hydrogen, a halogen atom, or an alkyl group having 1 to 5 carbon atoms, and at least one of $R^3$ to $R^6$ is a fluorine atom, each $n_1$ to $n_3$ is an integer of 1 to 5, and X is an alkylene having 1 to 10 carbon atoms or an alkyl ether group having 1 to 10 carbon atoms.

When the non-reactive fluoro compound is used, the sensitivity to recording light can be enhanced by maximizing the difference in refractive index between the exposed portion and the non-exposed portion, and the sensitivity to recording light can be increased, thereby significantly increasing the recording efficiency.

As described above, the non-reactive fluoro compound may have a refractive index of less than about 1.45, preferably about 1.30 to about 1.45, and more preferably about 1.30 to 1.40. In this case, it is possible to maximize the difference in refractive indexes of the photoreactive monomer, that is, the recording monomer which records information upon exposure, so that the exposure sensitivity can be greatly increased.

In addition, the non-reactive fluoro compound may serve to enhance the dispersibility and flexibility of the acrylate-based polyol and the isocyanate-based polymer matrix described above. That is, since the non-reactive fluoro compound has no reactivity with an acrylate-based polyol, isocyanate, or other photoreactive monomers, it may exist in the matrix while maintaining its inherent properties. Due to these properties, it may serve to appropriately control the interaction between polymers, and thus improve the photopolymerization efficiency upon exposure.

On the other hand, the photoreactive monomer may include a multifunctional (meth)acrylate monomer or a monofunctional (meth)acrylate monomer.

As described above, in the process of the photopolymerization of the photopolymerizable composition, in a portion where the monomer is polymerized and a relatively large amount of polymer is present, the refractive index becomes high, and in a portion where a relatively large number of polymeric binders are present, the refractive index becomes relatively lowered, resulting in the refractive index modulation, and generation of a diffraction grating.

Specifically, examples of the photoreactive monomer include (meth)acrylate-based α,β-unsaturated carboxylic acid derivatives, such as (meth)acrylate, (meth)acrylamide, (meth)acrylonitrile, (meth)acrylic acid, and the like, or a compound containing a vinyl group or a thiol group.

One example of the photoreactive monomer may be a multifunctional (meth)acrylate monomer having a refractive index of 1.5 or more. The multifunctional (meth)acrylate monomer having a refractive index of 1.5 or more may include a halogen atom (bromine, iodine, etc.), sulfur (S), phosphorus (P), or an aromatic ring.

More specific examples of the multifunctional (meth)acrylate monomer having a refractive index of 1.5 or more include a bisphenol A modified diacrylate type, a fluorene acrylate type, a bisphenol fluorene epoxy acrylate type (HR6100, HR6060, HR6042, etc., Miwon Specialty Chemical), a halogenated epoxy acrylate type (HR1139 and HR3362, Miwon Specialty Chemical), and the like.

Another example of the photoreactive monomer may be a monofunctional (meth)acrylate monomer. The monofunctional (meth)acrylate monomer may contain an ether bond and a fluorene functional group in the molecule. Specific examples of such monofunctional (meth)acrylate monomers include phenoxybenzyl (meth)acrylate, o-phenylphenol ethylene oxide (meth)acrylate, benzyl (meth)acrylate, 2-(phenylcyano)ethyl (meth)acrylate, biphenylmethyl (meth)acrylate, and the like.

Meanwhile, the photoreactive monomer may have a weight average molecular weight of 50 to 1000, or 200 to 600. The weight average molecular weight means a weight average molecular weight in terms of polystyrene measured by a GPC method. Meanwhile, the photopolymerizable composition of the embodiment includes a photoinitiator. The photoinitiator is a compound which is activated by light or actinic radiation, and initiates polymerization of a compound containing a photoreactive functional group such as the photoreactive monomer.

As the photoinitiator, a commonly known photoinitiator can be used without particular limitation, but specific examples thereof include photo-radical polymerization initiators and photo-cationic polymerization initiators.

Examples of the photo-radical polymerization initiator include imidazole derivatives, bisimidazole derivatives, N-aryl glycine derivatives, organic azide compounds, titanocene, aluminate complexes, organic peroxide, N-alkoxy pyridinium salt, thioxanthone derivatives, and the like. More specific examples of the photo-radical polymerization initiator include 1,3-di(t-butyldioxycarbonyl)benzophenone, 3,3',4,4'-tetrakis(t-butyldioxycarbonyl)benzophenone, 3-phenyl-5-isoxazolone, 2-mercaptobenzimidazole, bis(2,4,5-triphenyl)imidazole, 2,2-dimethoxy-1,2-diphenylethane-1-on (trade name: Irgacure 651, manufactured by BASF), 1-hydroxy-cyclohexyl-phenyl-ketone (trade name: Irgacure 184, manufactured by BASF), 2-benzyl-2-dimethylamino-1-(4-morpholinophenyl)-butane-1-one (trade name: Irgacure 369, manufactured by BASF), and bis(η5-2,4-cyclopentadien-1-yl)-bis (2,6-difluoro-3-(1H-pyrrole-1-yl)-phenyl)titanium (trade name: Irgacure 784, manufactured by BASF) or the like.

The photo-cationic polymerization initiator may include a diazonium salt, a sulfonium salt, or an iodonium salt, and examples thereof may be sulfonic acid ester, imido sulfonate, dialkyl-4-hydroxylsulfonium salt, aryl sulfonic acid-p-nitrobenzyl ester, silanol-aluminum complexes, (η6-benzene)(η5-cyclopentadienyl)iron (II), and the like. In addition, benzoin tosylate, 2,5-dinitrobenzyltosylate, N-tosylphthalic acid imide, and the like may be exemplified. More specific examples of the photo-cationic polymerization initiator include commercially available products such as Cyracure UVI-6970, Cyracure UVI-6974, and Cyracure UVI-6990 (manufactured by Dow Chemical Co. in USA), as well as Irgacure 264 and Irgacure 250 (manufacturer: BASF) and CIT-1682 (manufactured by Nippon Soda) and the like.

In addition, the photopolymerizable composition of the embodiment may include monomolecular (type I) and bimolecular (type II) initiators. (Type I) systems for free radical photopolymerization are, for example, aromatic ketone compounds, e.g. benzophenones, in combination with tertiary amines, alkylbenzophenones, 4,4'-bis(dimethylamino) benzophenone (Michler's ketone), anthrone, and halogenated benzophenones or mixtures of said types. (Type II) initiators may be benzoin and its derivatives, benzyl ketals, acylphosphine oxides, e.g. 2,4,6-trimethylbenzoyldiphenylphosphine oxide, bisacylophosphine oxide, phenylglyoxylic esters, camphorquinone, alpha-aminoalkylphenone, alpha,alpha-dialkoxyacetophenone, 1-[4-(phenylthio)phenyl]octane-1,2-dione 2-(O-benzoyloxime), alpha-hydroxyalkylphenone, and the like.

The photopolymerizable composition may include: A) about 20% to about 80% by weight of the polymer matrix or a precursor thereof; B) about 5% to about 40% by weight of the non-reactive fluoro compound; C) about 10% to about 70% by weight of the photoreactive monomer; and D) about 0.1% to about 10% by weight of the photoinitiator. Preferably, it may include: about 30% to about 70% by weight of the polymer matrix or a precursor thereof; about 5% to about 35% by weight of the non-reactive fluoro compound; about 20% to about 60% by weight of the photoreactive monomer; and about 0.1% to about 10% by weight of a photoinitiator. As described hereinafter, when the photopolymerizable composition further includes an organic solvent, the content of the above-mentioned components is based on the sum of these components (the sum of the components excluding the organic solvent).

According to a further embodiment of the present invention, the photopolymerizable composition may further include a separate plasticizer.

The plasticizer can serve to control the melting point, flexibility, toughness, diffusion degree of a monomer, and processability of each component contained in the composition. Such plasticizers specifically include, for example, phthalate-based plasticizers including dibutyl phthalate and the like, polyalkyl ether-based plasticizers including poly(ethylene oxide)methyl ether and the like, alkylamide-based plasticizers including N,N-dimethylformamide and the like, cyclohexanedicarboxylic acid-based plasticizers including cyclohexanedicarboxylic acid diisononyl ester and the like, phosphorus-based plasticizers including tributyl phosphate and the like, and citrate-based plasticizers. The plasticizers are distinguished from a solvent in terms of remaining in the holographic storage medium and controlling the physical properties of each polymer component.

When such a plasticizer is used, particularly together with the above-mentioned non-reactive fluoro compound, the effect can be maximized Specifically, the non-reactive fluoro compound and the plasticizer component described above can improve the flexibility of the polyurethane-based polymer matrix having a specific structure which is formed by the reaction of the above-mentioned acrylate-based polyol and isocyanate, and in particular, they can maximize the dispersibility of the photoreactive monomer in the matrix, and are not involved in the polymerization of the photoreactive monomer by exposure, and the interference pattern is diffused to the empty space, thereby greatly improving the contrast ratio of the formed hologram.

Meanwhile, the photopolymerizable composition may further include a photosensitizing dye. The photosensitizing dye acts as a sensitizing dye for sensitizing the photoinitiator. More specifically, the photosensitizing dye may be stimulated by the light irradiated to the photopolymer composition and may serve as an initiator to initiate the polymerization of the monomer and the crosslinking monomer. The photopolymerizable composition may contain 0.01% to 30% by weight, or 0.05% to 20% by weight of the photosensitive dye.

The examples of the photosensitizing dye are not particularly limited, various commonly known compounds can be used. Specific examples of the photosensitizing dye include sulfonium derivative of ceramidonines, new methylene blue, thioerythrosine triethylammonium, 6-acetylamino-2-methylceramidonine, Eosin, Erythrosine, Rose bengal, thionine, Basic Yellow, Pinacyanol chloride, Rhodamine 6G, Gallocyanine, Ethyl Violet, Victoria Blue R, Celestine Blue, Quinaldine Red, Crystal Violet, Brilliant Green, Astrazon Orange G, Darrow Red, Pyronin Y, Basic Red 29, Pyrylium iodide, Safranin O, Cyanine, Methylene blue, Azure A, and combinations of two or more thereof.

The photopolymerizable composition may further include an organic solvent. Non-limiting examples of the organic solvent include ketones, alcohols, acetates, and ethers, or mixtures of two or more thereof.

Specific examples of the organic solvent include ketones such as methyl ethyl ketone, methyl isobutyl ketone, acetylacetone, and isobutyl ketone; alcohols such as methanol, ethanol, n-propanol, i-propanol, n-butanol, i-butanol, and t-butanol; acetates such as ethyl acetate, i-propyl acetate, and polyethylene glycol monomethyl ether acetate; ethers such as tetrahydrofuran and propylene glycol monomethyl ether; or mixtures of two or more thereof.

The organic solvent may be added at the time of mixing the respective components contained in the photopolymerizable composition, or may be contained in the photopolymerizable composition while the respective components being added in a state of being dispersed in or mixed with the organic solvent. When the amount of the organic solvent in the photopolymerizable composition is too low, the flowability of the photopolymerizable composition may be lowered, resulting in the occurrence of defects such as the occurrence of striped patterns on the finally produced film. In addition, when the amount of the organic solvent is too large, the solid content is lowered, and the coating and film formation are not sufficient, so that the physical properties and surface characteristics of the film may be deteriorated and defects may occur during the drying and curing process. Thus, the photopolymerizable composition may include an organic solvent such that the total solid content concentration of the components contained is 1% to 70% by weight, or 2% to 50% by weight.

The photopolymerizable composition may further include other additives, catalysts, and the like. For example, the photopolymerizable composition may include a catalyst which is commonly known for promoting polymerization of the polymer matrix or photoreactive monomer. Examples of the catalyst include tin octanoate, zinc octanoate, dibutyltin dilaurate, dimethylbis[(1-oxoneodecyl)oxy]stannane, dimethyltin dicarboxylate, zirconium bis(ethyl hexanoate), zirconium acetylacetonate, and tertiary amines such as 1,4-diazabicyclo [2.2.2]octane, diazabicyclo nonane, diazabicyclo undecane, 1,1,3,3-tetramethylguanidine, 1,3,4, 6,7,8-hexahydro-1-methyl-2H-pyrimido(1,2-a)pyrimidine, and the like.

Meanwhile, according to another exemplary embodiment of the present invention, a hologram recording medium produced from the photopolymer composition can be provided.

As described above, when the photopolymerizable composition according to an exemplary embodiment is used, it is possible to provide holograms capable of achieving a significantly improved refractive index modulation value and high diffraction efficiency while having a thinner thickness, as compared with holograms previously known in the art.

The hologram recording medium can realize a refractive index modulation value (n) of 0.009 or more, or 0.010 or more, even at a thickness of 5 µm to 30 µm.

In the photopolymerizable composition of another exemplary embodiment, the respective components contained therein are homogeneously mixed, dried, and cured at a temperature of 20° C. or higher, and then predetermined exposure procedures are undertaken, thereby producing a hologram for optical application in the entire visible range and the near ultraviolet region (300 to 800 nm).

In the photopolymerizable composition of another exemplary embodiment, the remaining components excluding the compound containing at least one isocyanate group for forming a polymer matrix or the precursor thereof are first homogeneously mixed. Subsequently, the compound containing at least one isocyanate group can be mixed with the catalyst to prepare holograms.

In the photopolymerizable composition of another exemplary embodiment, a mixing device, a stirrer, a mixer, or the like which are commonly known in the art can be used for mixing the respective components contained therein without particular limitation. The temperature in the mixing process can be 0° C. to 100° C., preferably 10° C. to 80° C., and particularly preferably 20° C. to 60° C.

Meanwhile, in the photopolymerizable composition of another exemplary embodiment, the remaining components excluding the compound containing at least one isocyanate group for forming a polymer matrix or the precursor thereof are first homogenized and mixed. Subsequently, at the time of adding the compound containing at least one isocyanate group, the photopolymerizable composition can be a liquid formulation that is cured at a temperature of 20° C. or more.

The temperature of the curing may be varied depending on the constitution of the photopolymerizable composition, and the curing is promoted, for example, by heating at a temperature of from 30° C. to 180° C., preferably from 40° C. to 120° C., and particularly preferably from 50° C. to 100° C.

At the time of curing, the photopolymerization property may be in state of being injected into or coated onto a predetermined substrate or mold.

Meanwhile, as the method of recording a visual hologram on a hologram recording medium produced from the photopolymerizable composition, generally known methods can be used without particular limitation. The method described in the holographic recording method of the embodiment described hereinafter can be adopted as one example.

Meanwhile, according to another exemplary embodiment of the invention, a holographic recording method which includes selectively polymerizing photoreactive monomers contained in the photopolymerizable composition using actinic rays may be provided.

As described above, through the process of mixing and curing the photopolymerizable composition, it is possible to produce a medium in a form in which no visual hologram is recorded, and a visual hologram can be recorded on the medium through a predetermined exposure process.

A visual hologram can be recorded on the media provided through the process of mixing and curing the photopolymerizable composition, using known devices and methods under commonly known conditions.

Meanwhile, according to another embodiment of the invention, an optical element including a hologram recording medium can be provided.

Specific examples of the optical element include optical lenses, mirrors, deflecting mirrors, filters, diffusing screens, diffraction elements, light guides, waveguides, holographic optical elements having projection screen and/or mask functions, mediums of optical memory systems and light diffusion plates, optical wavelength multiplexers, reflection and transmission types of color filters, and the like.

An example of an optical element including the hologram recording medium may include a hologram display device.

The hologram display device includes a light source unit, an input unit, an optical system, and a display unit. The light source unit is a portion that irradiates a laser beam used for providing, recording, and reproducing three-dimensional image information of an object in the input unit and the display unit. Further, the input unit is a portion that previously inputs three-dimensional image information of an object to be recorded on the display unit, and for example, three-dimensional information of an object such as the intensity and phase of light for each space can be inputted into an electrically addressed liquid crystal SLM, wherein an input beam may be used. The optical system may include a mirror, a polarizer, a beam splitter, a beam shutter, a lens, and the like. The optical system can be distributed into an input beam for sending a laser beam emitted from the light source unit to the input unit, a recording beam for sending the laser beam to the display unit, a reference beam, an erasing beam, a reading beam, and the like.

The display unit can receive three-dimensional image information of an object from an input unit, record it on a hologram plate including an optically addressed SLM, and reproduce the three-dimensional image of the object. In this case, the three-dimensional image information of the object can be recorded via interference of the input beam and the reference beam. The three-dimensional image information of the object recorded on the hologram plate can be reproduced into a three-dimensional image by the diffraction pattern generated by the reading beam. The erasing beam can be used to quickly remove the formed diffraction pattern. Meanwhile, the hologram plate can be moved between a position at which a three-dimensional image is inputted and a position at which a three-dimensional image is reproduced.

According to the present invention, a photopolymerizable composition capable of more easily providing a hologram recording layer having a significantly improved refractive index modulation value and high diffraction efficiency while having thin thickness, a hologram recording medium including a hologram recording layer formed from the composition, an optical element including the hologram recording medium, and a holographic recording method including selectively polymerizing photoreactive monomers contained in the composition by actinic rays, can be provided.

The action and effect of the present invention are now described in more detail by way of the following examples. However, these examples are given for illustrative purposes only, and the scope of the present invention is not intended to be limited to or by the examples.

EXAMPLE

Preparation of Non-Reactive Fluoro Compound 1

20.51 g of 2,2'-((oxybis(1,1,2,2-tetrafluoroethane-2,1-diyl))bis(oxy))bis (2,2-difluoroethan-1-ol) was added to a 1000 ml flask, and then dissolved in 500 g of tetrahydrofuran, to which 4.40 g of sodium hydride (60% dispersion in mineral oil) was added repeatedly while stirring at 0° C.

After stirring at 0° C. for 20 minutes, 12.50 ml of 2-methoxyethoxymethyl chloride was slowly added dropwise. It was confirmed by 1H NMR that all the reactants were consumed, and the reaction solvent was completely removed under reduced pressure.

Extraction was performed three times with 300 g of dichloromethane, the organic layer was collected and filtered with magnesium sulfate, and all dichloromethane was removed under reduced pressure. Thereby, 29 g of a liquid product having a purity of 95% or more and a yield of 98% was obtained.

The refractive index (at 589 nm) of the liquid product, as measured by an Abbe refractometer, was 1.37.

The chemical formula of the liquid product is as follows:

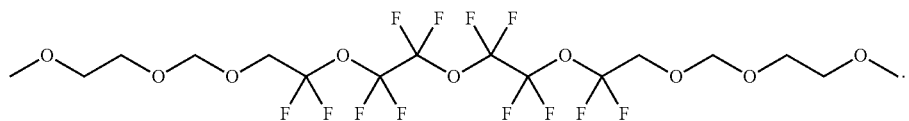

Preparation of Non-Reactive Fluoro Compound 2

12.30 g of 2,2'-((oxybis(1,1,2,2-tetrafluoroethane-2,1-diyl))bis(oxy))bis (2,2-difluoroethan-1-ol) was added to a 1000 ml flask and diluted with 300 ml of tetrahydrofuran (THF), to which 16.77 ml of hexanoyl chloride was added dropwise while stirring at 0° C. in an ice-bath.

After 20 minutes, 16.74 ml of triethylamine was injected dropwise, and the ice-bath was removed. The reaction was allowed to proceed until it was confirmed by Thin Layer Chromatography (TLC) that the reaction was completed while gradually raising the temperature to room temperature.

After completion of the reaction, the triethylamine hydrochloride salt produced as a by-product was removed by filtration, and the solvent THF was removed under reduced pressure. Extraction was performed three times with dichloromethane and a 1N aqueous NaOH solution. Then, column chromatography was carried out under the developing solution of ethyl acetate:n-hexane mixed in a ratio of 1:20 to obtain a product having a purity of 90% or more. The refractive index (at 589 nm) of the liquid product, as measured by an Abbe refractometer, was 1.38.

The chemical formula of the liquid product is as follows:

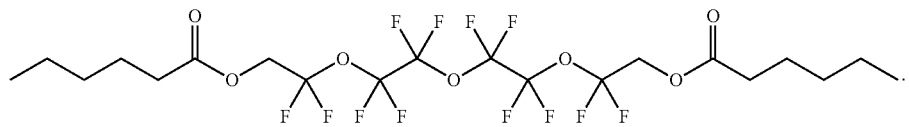 [SMILES: CCCCCC(=O)OCC(F)(F)OC(F)(F)C(F)(F)OC(F)(F)C(F)(F)OC(F)(F)COC(=O)CCCCC]

Preparation of Acrylate-Based Polyol Component 34.5 g of methyl acrylate, 57.5 g of butyl acrylate, and 8 g of 4-hydroxybutyl acrylate were added to a 2 L jacket reactor, and diluted with 150 g of ethyl acetate. The reaction temperature was adjusted to 60° C. to 70° C., and stirring was performed for about 1 hour. 0.035 g of n-dodecyl mercaptan was further added thereto, and stirring was preformed for about 30 minutes.

Then, 0.04 g of azo-bis-isobutyronitrile (AIBN) was added as a polymerization initiator, the polymerization was performed for 4 hours or more at the above reaction temperature, and polymerization was continued until the residual acrylate content became less than 1%. Thereby, an acrylate-based polyol having a weight average molecular weight of about 700,000 and an OH equivalent of 1802 g/OH mole was prepared.

Preparation of Photoreactive Polymer Composition

Each component of the composition is summarized in Table 1 below.

The acrylate-based polyol prepared above, a photoreactive monomer (1 to 2-functional acrylate, HR 6042, Miwon Specialty Chemical, refractive index of 1.600), a plasticizer (tributyl phosphate, TBP, Sigma Aldrich), a non-reactive fluoro compound prepared above, a dye (Safranin 0, Sigma Aldrich), a photoinitiator 1 (Ebecryl P-115, SK Entis), a photoinitiator 2 (Borate V, Spectra Group), a photoinitiator 3 (Irgacure 250, BASF), and a solvent (methyl isobutyl ketone) were mixed, and then the mixture was stirred with a paste mixer for about 10 minutes to prepare a transparent coating liquid.

A hexafunctional isocyanate component (MFA-75X, Asahi Kasei, diluted with 75 wt % of xylene) was added thereto, and stirred for another 5 minutes.

0.011 g of dibutyltin dilaurate (DBTDL) as a catalyst was added thereto, and the reaction was allowed to proceed while stirring for about 1 minute, to prepare a photoreactive polymer composition.

Preparation of Holographic Recording Medium

The photoreactive polymer composition prepared above was coated onto an 80 μm thick triacetyl cellulose (TAC) substrate at a thickness of 7 μm using a Meyer bar, and cured at 40° C. for 30 minutes. Then, the sample was allowed to stand for 24 hours or more in a constant temperature and humidity conditioned dark room at about 25° C. and about 50% relative humidity.

Experimental Example: Hologram Recording (1) The holographic recording medium-coated surface prepared in each of the examples and comparative examples was laminated on a slide glass, and fixed so that a laser first passed through the glass surface at the time of recording.

(2) A holographic recording was done via interference of two interference lights (reference light and object light), and the transmission-type recording was done so that the two beams were incident on the same side of the sample. The diffraction efficiencies were changed according to the incident angle of the two beams, and became non-slanted when the incident angles of the two beams were the same. In the non-slanted recording, the diffraction grating was generated perpendicularly to the film because the incident angles of the two beams were the same on the normal basis.

The recording (2θ=45°) was done in a transmission-type non-slanted manner using a laser with a wavelength of 532 nm, and the diffraction efficiency (η) was calculated according to the following Equation 1:

$$\eta = \frac{P_D}{P_D + P_T}.$$ [Equation 1]

In Equation 1, η is diffraction efficiency, $P_D$ is an output amount (mW/cm$^2$) of the diffracted beam of a sample after recording, and $P_T$ is an output amount (mW/cm$^2$) of the transmitted beam of the recorded sample.

The laser loss ($I_{loss}$) of the transmission type of hologram can be calculated from the following Equation 2:

$$I_{loss} = 1 - (P_D + P_T)/I_0.$$ [Equation 2]

In Equation 2, $I_0$ is intensity of the recording light (mW/cm$^2$), PD is an output amount (mW/cm$^2$) of the diffracted beam of the sample after recording, and PT is an output amount (mW/cm$^2$) of the transmitted beam of the recorded sample.

The measurement results are summarized in Table 1 below.

index modulation value (Δn) as compared with the comparative examples.

In particular, it was confirmed that when the plasticizer component and the non-reactive fluoro compound of the present invention were used simultaneously, a higher refractive index modulation value and diffraction efficiency were achieved due to securing the mobility of the components in the polymer matrix and the movement of non-reactive low refractive index materials (non-reactive fluoro compound and plasticizer).

The invention claimed is:

1. A photopolymerizable composition comprising:
  A) a polymer matrix or a precursor thereof containing a reaction product of:
    i) an acrylate-based polyol having an OH equivalent of 1000 g/mol or more and a weight average molecular weight of 500,000 or more, and
    ii) an isocyanate compound;
  B) the non-reactive fluoro compound represented by Chemical Formula 1 or 2:

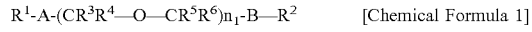

R$^1$-A-(CR$^3$R$^4$—O—CR$^5$R$^6$)n$_1$-B—R$^2$ [Chemical Formula 1]

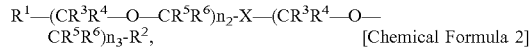

R$^1$—(CR$^3$R$^4$—O—CR$^5$R$^6$)n$_2$-X—(CR$^3$R$^4$—O—CR$^5$R$^6$)n$_3$-R$^2$, [Chemical Formula 2]

wherein, in Chemical Formula 1 and 2,
R$^1$ and R$^2$ are terminal blocking groups that are the same as or different from each other, and are each independently an alkyl ester group having 1 to 10 carbon atoms or an alkyl ether group having 1 to 10 carbon atoms, wherein the alkyl ester group and the alkyl ether group are substituted or unsubstituted with a halogen atom,
A and B are a single bond or an alkylene group having 1 to 5 carbon atoms,
R$^3$ to R$^6$ are the same as or different from each other, and are each independently hydrogen, a halogen atom, or an alkyl group having 1 to 5 carbon atoms, and at least one of R$^3$ to R$^6$ is a fluorine atom,
each n$_1$ to n$_3$ is an integer of 1 to 5, and

TABLE 1

| | Example 1 | Example 2 | Example 3 | Example 4 | Example 5 | Example 6 | Comparative Example 1 | Comparative Example 2 |
|---|---|---|---|---|---|---|---|---|
| Polyol (g) | 23.2 | 23.2 | 23.2 | 23.2 | 23.2 | 27.4 | 23.2 | 48.8 |
| Isocyanate (g) | 1.7 | 1.7 | 1.7 | 1.7 | 1.7 | 2 | 1.7 | 3.6 |
| Photoreactive monomer (g) | 40.3 | 40.3 | 40.3 | 40.3 | 40.3 | 45.3 | 40.3 | 75.0 |
| Dye (g) | 0.1 | 0.1 | 0.1 | 0.1 | 0.1 | 0.1 | 0.1 | 0.1 |
| Photoinitiator 1 (g) | 1.5 | 1.5 | 1.5 | 1.5 | 1.5 | 1.5 | 1.5 | 2.0 |
| Photoinitiator 2 (g) | 0.26 | 0.26 | 0.26 | 0.26 | 0.26 | 0.26 | 0.26 | 0.4 |
| Photoinitiator 3 (g) | 0.1 | 0.1 | 0.1 | 0.1 | 0.1 | 0.1 | 0.1 | 0.1 |
| Plasticizer | 10.0 | 15 | 20 | — | 20 | 25 | 30 | — |
| Non-reactive fluoro compound 1 (g) | 20.0 | 15 | 10 | 30 | — | — | — | — |
| Non-reactive fluoro compound 2 (g) | — | — | — | — | 10 | 5 | — | — |
| Methyl isobutyl ketone (g) | 210.8 | 210.8 | 210.8 | 210.8 | 210.8 | 210.8 | 210.8 | 178.0 |
| Refractive index modulation value n | 0.026 | 0.03 | 0.025 | 0.024 | 0.02 | 0.017 | 0.013 | 0.008 |
| $I_{loss}$ | 0.29 | 0.25 | 0.15 | 0.35 | 0.20 | 0.17 | 0.10 | 0.09 |
| Coating thickness (μm) | 7 | 7 | 7 | 7 | 7 | 7 | 7 | 7 |

As shown in Table 1 above, it was confirmed that the photopolymer compositions using the non-reactive fluoro compound prepared according to the examples of the present invention in combination with the polyol, isocyanate, and photoreactive monomer provides a hologram which realizes high diffraction efficiency together with a high refractive X is an alkylene group having 1 to 10 carbon atoms or an alkyl ether group having 1 to 10 carbon atoms;
  C) a photoreactive monomer; and
  D) a photoinitiator.

2. The photopolymerizable composition of claim 1, wherein the acrylate-based polyol is an alkyl acrylate, wherein the alkyl group of the alkyl acrylate has 1 to 5 carbon atoms; and a compound containing a repeating unit derived from a hydroxyalkyl acrylate wherein the alkyl group of the hydroxyalkyl acrylate has 1 to 5 carbon atoms.

3. The photopolymerizable composition of claim 1, wherein the acrylate-based polyol has an OH equivalent of 1000 to 2000 g/mol and a weight average molecular weight of 600,000 to 800,000.

4. The photopolymerizable composition of claim 1, wherein the photoreactive monomer comprises a multifunctional (meth)acrylate monomer or a monofunctional (meth) acrylate monomer.

5. The photopolymerizable composition of claim 1, wherein the polyisocyanate compound is selected from aliphatic, cycloaliphatic, aromatic, or araliphatic mono-isocyanates, aliphatic, cycloaliphatic, aromatic, or araliphatic, di-isocyanate, aliphatic, cycloaliphatic, aromatic, or araliphatic tri-isocyanate, and aliphatic, cycloaliphatic, aromatic, or araliphatic poly-isocyanate.

6. The photopolymerizable composition of claim 1, wherein the polyol further includes:
at least one selected from the group consisting of aliphatic aromatic diols, triols, or polyols having 2 to 20 carbon atoms;
alicyclic diols, triols, or polyols having 4 to 30 carbon atoms; and
aromatic diols, triols, or polyols having 6 to 30 carbon atoms.

7. The photopolymerizable composition of claim 1, wherein the photopolymerizable composition includes:
A) 20% to 80% by weight of the polymer matrix or a precursor thereof;
B) 5% to 40% by weight of the non-reactive fluoro compound;
C) 10% to 70% by weight of the photoreactive monomer; and
D) 0.1% to 10% by weight of the photoinitiator.

8. The photopolymerizable composition of claim 1, further comprising a plasticizer.

9. A hologram recording medium comprising a hologram recording layer formed by the photopolymerizable composition of claim 1.

10. An optical element comprising the hologram recording medium of claim 9.

11. A method of recording a hologram, comprising selectively polymerizing photoreactive monomers by irradiating actinic rays on the hologram recording medium of claim 9.

12. The photopolymerizable composition of claim 1, wherein the polyisocyanate is selected from a urethane, urea, a carbodiimide, an acylurea, an isocyanurate, an allophanate, a biuret, an oxadiazinetrione, an uretdione, or an iminooxadiazinedione.

* * * * *